(12) United States Patent
Quintero et al.

(10) Patent No.: US 10,494,563 B2
(45) Date of Patent: Dec. 3, 2019

(54) METHOD OF IMPROVING MOBILITY OF HEAVY CRUDE OILS IN SUBTERRANEAN RESERVOIRS

(71) Applicant: BAKER HUGHES, A GE COMPANY, LLC, Houston, TX (US)

(72) Inventors: Lirio Quintero, Houston, TX (US); Jose Marcos, Monagas (VE); German Rodrigo Gomez Serna, Houston, TX (US); Sebastian Mesa, Cundinamarca (CO); Carlos F. Toro, Cundinamarca (CO)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/250,442

(22) Filed: Aug. 29, 2016

(65) Prior Publication Data
US 2017/0058188 A1    Mar. 2, 2017

Related U.S. Application Data

(60) Provisional application No. 62/212,779, filed on Sep. 1, 2015.

(51) Int. Cl.
*E21B 43/16* (2006.01)
*C09K 8/584* (2006.01)
*C09K 8/035* (2006.01)

(52) U.S. Cl.
CPC .............. *C09K 8/584* (2013.01); *C09K 8/035* (2013.01); *E21B 43/16* (2013.01)

(58) Field of Classification Search
CPC ............ C09K 8/584; C09K 8/58; E21B 43/16
See application file for complete search history.

(56) References Cited

U.S. PATENT DOCUMENTS

| 6,267,716 B1 * | 7/2001 | Quintero ................. C09K 3/32 175/66 |
| 2006/0073986 A1 * | 4/2006 | Jones ....................... C09K 8/36 507/129 |
| 2008/0261835 A1 | 10/2008 | Berger et al. |
| 2008/0274918 A1 * | 11/2008 | Quintero ................ C09K 8/524 507/116 |
| 2009/0008091 A1 * | 1/2009 | Quintero ................ C09K 8/524 166/270.1 |
| 2010/0081587 A1 * | 4/2010 | van Zanten ............... C09K 8/34 507/235 |
| 2010/0314296 A1 | 12/2010 | Pacheco et al. |
| 2011/0009556 A1 | 1/2011 | Faust, Jr. et al. |
| 2011/0036573 A1 * | 2/2011 | Weaver .................... C09K 8/36 166/295 |
| 2011/0278004 A1 * | 11/2011 | Ali ......................... C09K 8/524 166/285 |
| 2012/0267113 A1 | 10/2012 | Fletcher et al. |
| 2013/0081808 A1 * | 4/2013 | Zeidani .................. C09K 8/592 166/272.4 |
| 2014/0083705 A1 * | 3/2014 | Schacht Hernandez ..................... C09K 8/584 166/305.1 |
| 2014/0224483 A1 | 8/2014 | Hart |

FOREIGN PATENT DOCUMENTS

RU    2211325 C1    8/2003

OTHER PUBLICATIONS

WIPO; Patent Cooperation Treaty: PCT International Search Report; Issued in connection to PCT/US2016/049289; dated Oct. 21, 2016; 5 pages; Europe.
WIPO, Patent Cooperation Treaty: PCT Written Opinion of the International Searching Authority; Issued in connection to PCT/US2016/049289; dated Oct. 21, 2016; 9 pages; Europe.
Salager et al.; "Enhancing Solubilization in Microemulsions—State of the Art and Current Trends;" Journal of Surfactants and Detergents, vol. 8, No. 1; Jan. 2005.
Chapter 1: Heavy Oil and Tar Sand Bitumen; Introduction to Enhanced Recovery Methods for Heavy Oil and Tar Sands; 2016; pp. 3-48; Elsevier Inc.
Wikipedia; API Gravity; https://en.wikipedia.org/wiki/API_gravity; Apr. 26, 2018; 3 pages.
European Patent Office; Communication pursuant to Rules 161(1) and 162 EPC, issued in connection to EP16763648.9; dated Apr. 10, 2018; 3 pages; Europe.
Russian Patent Office; Translation of the Office Action, issued in connection to RU2018109296; dated Nov. 27, 2018; 3 pages; Russia.
Colombian Patent and Trademark Office; Second Office Action issued in connection to Application No. MC2018/0002539; dated Jun. 7, 2019; 18 pages; Colombia.
Colombian Patent and Trademark Office; First Office Action issued in connection to Application No. MC2018/0002539; dated Mar. 15, 2018; 6 pages; Colombia.

\* cited by examiner

*Primary Examiner* — Silvana C Runyan
(74) *Attorney, Agent, or Firm* — Greenberg Traurig LLP

(57) ABSTRACT

A method for improving mobility of heavy crude oil in a subterranean reservoir is provided. A fluid formulation can be introduced into the reservoir, the fluid formulation comprising water and a surfactant, and optional co-solvents. The fluid formulation can produce one or more of a dispersion and an emulsion in the reservoir, whereby the surfactant acts as an dispersant or emulsifying agent, emulsifier and/or drag reducing agent. The emulsion or the dispersion can have a water external phase and a crude oil internal phase.

26 Claims, No Drawings

METHOD OF IMPROVING MOBILITY OF HEAVY CRUDE OILS IN SUBTERRANEAN RESERVOIRS

RELATED APPLICATIONS

This application claims the benefit, and priority benefit, of U.S. Provisional Patent Application Ser. No. 62/212,779, filed Sep. 1, 2015, the disclosure and contents of which are incorporated by reference herein in their entirety.

FIELD OF THE INVENTION

The present invention relates generally to crude oil production, and more specifically, to improving mobility of heavy crude oil in a subterranean reservoir.

BACKGROUND

Crude oil production from subterranean reservoirs can include three distinct recovery phases: primary recovery, secondary recovery, and tertiary recovery. During primary recovery, the natural pressure within the reservoir can drive the oil to the production wellbore where pumps or other artificial lift devices can deliver it to the surface. During secondary recovery, water or gas can be injected into the reservoir to further drive or "push" the oil into the production wellbore. During tertiary recovery, chemicals, gas and/or heat can be injected into the reservoir to change the interfacial properties and physical properties of the heavy crude oil trapped in the pores of the reservoir rock, to further enhance recovery.

Tertiary recovery continues to present technical and economic challenges for producers, due in part to the relatively high viscosity of the trapped oil. Improvements in this field of technology are therefore desired.

SUMMARY

Disclosed herein are various methods for improving the mobility of heavy crude oil in a porous subterranean reservoir. In certain illustrative embodiments, a fluid formulation is introduced into the reservoir. The fluid formulation can include water and a surfactant. At least one of an emulsion and a dispersion can be produced in the reservoir. The emulsion or the dispersion can have a water external phase and a crude oil internal phase.

In certain aspects, the fluid formulation can also include one or more of a co-surfactant, a co-solvent and a linker. The co-surfactant can include one or more of an alcohol, a glycol, an ethoxylated alcohol, an ethoxylated glycol, an ethoxylated phenol, a propoxylated alcohol, a propoxylated glycol, a propoxylated phenol, an ethoxylated and propoxylated alcohol, an ethoxylated and propoxylated glycol, an ethoxylated and a propoxylated phenol, or combinations thereof. The co-solvent can include one or more of butoxyethanol and a glycol ether. The glycol ether can include one or more of ethylene glycol ether, diethylene glycol ether and triethylene glycol ether. The linker can include one or more of a carboxylic acid, a naphthalene sulfonic acid, a glutamic acid, an alcohol with more than eight carbon atoms, a glycol, a polyol, and a phenol, or combinations thereof. The fluid formulation can also include one or more of an emulsifier, a drag reducer and an alkaline solution.

In certain aspects, the fluid formulation can be injected into the reservoir via an injection well. The fluid formulation can be pumped into the reservoir from a producer well via a huff and puff process. The water in the fluid formulation can be fresh water. The water in the fluid formulation can also be recycled produced water from a crude oil reservoir. In certain aspects, the fluid formulation is not an emulsion or a dispersion prior to being introduced into the reservoir.

In certain aspects, the surfactant can be an amphiphilic chemical compound. The amphiphilic chemical compound can be a nonionic compound, an anionic compound, a cationic compound, an amphoteric compound or a zwitterionic compound, or combinations thereof. The amphiphilic chemical compound can be a nonionic compound having a hydrophile/lipophile balance greater than 10. In some aspects, the surfactant can include in the range from 20-30% methanol. In other aspects, the surfactant can include in the range from 5-10% 2-butoxyethanol.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates to various illustrative embodiments of a method for improving mobility of heavy crude oil in a subterranean reservoir.

In an illustrative embodiment, a fluid formulation is introduced into the reservoir, the fluid formulation comprising water and a surfactant, and optional co-solvents. The fluid formulation produces one or more of a dispersion and an emulsion in the reservoir, whereby the surfactant acts as an dispersant or emulsifying agent, emulsifier and/or drag reducing agent. In general, the emulsion can be characterized as a fine dispersion of very small droplets of one liquid in another immiscible liquid. The phase that is present in the form of droplets is the dispersed or internal phase, and the phase in which the droplets are suspended is called the continuous or external phase.

In certain illustrative embodiments, the dispersion is an "oil-in-water" dispersion and the emulsion is an "oil-in-water" emulsion, wherein water is the external phase and crude oil is the internal phase. The oil-in-water emulsion and the oil-in-water dispersion are less viscous than the heavy crude oil that was previously trapped in the reservoir pores, which means that the emulsion requires less reservoir pressure to flow and be produced and exhibits reduced pressure required for pumping and transporting by pipelines to the heavy crude oil treatment facilities.

Note that the majority of crude oils, especially the heavy crude oils, are produced with a certain percentage of production water or water cut. Part of the production water is naturally-emulsified during the displacement in the reservoir and the production process. In that case, the produced crude oil is a water-in-crude oil emulsion. The viscosity of a water-in-crude oil emulsion is typically greater than the viscosity of the crude oil, whereas the viscosity of a crude oil-in-water emulsions is typically lower than the viscosity of the crude oil.

In certain illustrative embodiments, the fluid formulation produces a dispersion in the reservoir. It is known that dispersions can be solid-in-liquid or liquid-in-liquid. The liquid-in liquid dispersions produced with the fluid formulation described herein can ease the transport of heavy crude oil from the reservoir to the surface facilities. When the dispersion of fluids is produced to the surface facilities and reaches static conditions, the two liquids will separate. Heavy crude oil-in-water dispersions and heavy crude oil-in-water emulsions will increase the mobility of the heavy crude oils from the reservoir to the surface facilities. The benefit of a heavy crude oil-in-water dispersion compared to a heavy crude oil-in-water emulsion is that the process of fluids separation at the surface facilities will be faster and probably require less demulsifier treatment to removed water from the crude oil for further delivery to refineries.

In certain illustrative embodiments, the surfactant can be an amphiphilic chemical compound such as a nonionic compound, an anionic compound, a cationic compound, an amphoteric compound or a zwitterionic compound, or combinations thereof. As used herein, the phrase "amphiphilic chemical compound" means of, relating to, or being a compound (as a surfactant) consisting of molecules having a polar water-soluble group attached to a water-insoluble hydrocarbon chain, or being a molecule of such a compound. For example, the surfactant formulation can be PAW4™, which comprises an emulsifier surfactant and 20-30% methanol, or PAW4HF™, which comprises an emulsifier surfactant and 5-10% 2-butoxyethanol, both of which are commercially available from Baker Hughes Incorporated. These products are liquid organic emulsifiers which can be used in low gravity, asphaltic fuel and crude oils to assist in their production and transportation.

In certain illustrative embodiments, the fluid formulation can also comprise one or more of a co-surfactant, a co-solvent and a linker. The co-surfactant can be, for example, alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof. Suitables co-surfactants are mono- or poly-alcohols, low molecular weight organic acids, amines, polyethylene glycol, and mixtures thereof. The co-solvent can be, for example, butoxyethanol, and glycol ethers such as ethylene glycol ether, diethylene glycol ether triethylene glycol ether and the like. The linker can be, for example, carboxylic acids, naphthalene sulfonic acid, glutamic acid, alcohols with more than eight (8) carbon atoms, glycols, polyols, phenols, and combinations thereof. A linker molecule is a lipophilic or hydrophilic molecule that helps to increase the solubilization and modify the interfacial properties of a water or brine-oil-surfactant system.

In certain illustrative embodiments, the fluid formulation can also comprise one or more of a co-emulsifier, a drag reducer and an alkaline solution. The co-emulsifier can be, for example, a sulfonate, sulfate, carboxylate or ethoxylate surfactant. The drag reducer can be, for example, an ethoxylated surfactant. The alkaline solution can be, for example, amines, sodium bicarbonate, sodium hydroxide, or an ammonia/ammonium chloride buffer.

In certain illustrative embodiments, the surfactant can be a nonionic surfactant with a co-solvent. For example, in certain illustrative embodiments, the PAW4™ product from Baker Hughes Incorporated is formulated with a nonionic surfactant with a co-solvent. In other illustrative embodiments, the surfactant can be an anionic-nonionic blend with a co-solvent.

In certain illustrative embodiments, the nonionic surfactant in combination with a co-solvent can have a hydrophile/lipophile balance greater than 10. Hydrophile/lipophile balance or "HLB" is an empirical expression for the relationship of the hydrophilic ("water-affinity") and lipophilic ("oil-affinity") groups of a surfactant. In the particular case of nonionic surfactants, an HLB scale from 0 to 20 is used, where the affinity to water increases with the HLB number. Thus, the nonionic surfactant in combination with a co-solvent having a hydrophile/lipophile balance greater than 10 can be generally characterized as highly hydrophilic.

In certain illustrative embodiments, the fluid formulation that is introduced into the subterranean reservoir is not a pre-formed emulsion or dispersion. That is, the fluid formulation is not an emulsion or dispersion prior to being introduced into the reservoir. Instead, an emulsion or dispersion is only formed after the fluid formulation is introduced into the reservoir.

For purposes of this application, the term "heavy crude oils" refers to crude oils of less than 20° API gravity, including heavy crude oil, extra heavy crude oil and bitumen, preferably less than 15° API, which are typically black, highly viscous, and tacky to the touch.

In certain illustrative embodiments, the water in the fluid formulation is fresh water or brine, such as offsite water. In other illustrative embodiments, the water in the fluid formulation can be recycled produced water from a crude oil reservoir. The crude oil reservoir can be the same reservoir that is being treated with the fluid formulation or a different reservoir.

The production site can include at least one injection well and at least one production well, both being engaged with the subterranean reservoir. Thus, in certain illustrative embodiments, the fluid formulation can be injected into the reservoir via the injection well and the oil-in water dispersion or oil-in-water emulsion can flow into, and be recovered from, the production well. In other illustrative embodiments, a "huff and puff" process may be utilized whereby the fluid formulation is injected into the production well and then directed into the reservoir, and then the oil-in water dispersion or oil-in-water emulsion can be transported from the reservoir to the production well. In either case, oil mobility from the reservoir to the production well is increased when the viscosity of the oil is reduced.

The heavy crude oil that is trapped in the pores of the reservoir rock can have a viscosity that ranges from around one-hundred cP to more than a million cP depending on the reservoir temperature and the API gravity of the heavy crude oil. It is known that the viscosity of the crude oil decreases with the increase of temperature. In general, the temperature in the reservoir varies in a broad range depending on the region and depth of the reservoir. For example, the viscosity of some Venezuelan extra-heavy crude oils can be between 1000-5000 cP at the pressure and temperature reservoir conditions, while Canadian extra-heavy crude oils can have viscosities in the range of 5000-400,000 cP. The production of heavy crude oils is limited by their high viscosity. In certain illustrative embodiments, the trapped oil will have a viscosity reduction from about 5% to 100% or more after being treated according to the presently described methods.

To facilitate a better understanding of the presently disclosed subject matter, the following examples of certain aspects of certain embodiments are given. In no way should the following examples be read to limit, or define, the scope of the presently disclosed subject matter.

EXAMPLE 1

Table 1 shows the viscosity of a heavy crude oil—#1/water sample measured at 120° F. without any chemical additive and with the addition of small concentrations of a chemical additive (specifically, PAW4):

TABLE 1

| Concentration of additive added, % | Viscosity (cP) of heavy crude oil having 40% water cut |
|---|---|
| 0 | 27540 |
| 0.03 | 10700 |
| 0.1 | 536 |

Table 2 shows viscosity of various water/heavy crude oil #2 ratios measured at 150° F. with 0.12% of chemical additive (specifically, PAW4HF):

TABLE 2

| Crude oil with various water/oil ratio | Viscosity, cP | Viscosity, cP (water + 0.12% of chemical treatment)/oil |
|---|---|---|
| 0/100 | 5009 | N/A |
| 20/80 | 4799 | No reduction in viscosity |
| 30/70 | 2699 | 2459 |
| 40/60 | 2160 | 1080 |
| 60/40 | 1260 | 439 |
| 70/30 | 839 | 10 |

Laboratory tests were performed in a Sandpack Permeameter to evaluate the effect of the chemical formulation to improve heavy oil recovery by addition of a chemical additive that produces a reduction of the viscosity in the water/oil mixture.

The first step of the test consisted of simulating the porous media by packing the sand in the cell. Then, the following steps were performed: (1) flow of low salinity brine (3% sodium chloride) was performed to water-saturate the sand; (2) flow of heavy crude oil was performed until the flow was stabilized to measure the oil saturation; and (3) water was injected to simulate the water injection process. The oil saturation was measured to calculate the oil recovery by water injection. This result corresponded to the baseline. Then the process was repeated, but in the last step the water was injected in combination with a chemical formulation to improve the mobility of the heavy oil in the reservoir.

The results of the two tests performed with two chemical formulations are shown in Table 3 and Table 4 below. The heavy crude oil #3 sample had a viscosity of 1300 cP at 150° F. (this measurement was made in a sample without water).

Table 3 shows Sand Pack test results using a heavy crude oil #3 sample and chemical additive formulation #1 (specifically, PAW4HF) at 150° F.:

TABLE 3

|  | Test without chemical treatment | Test with chemical treatment |
|---|---|---|
| Residual oil saturation, % | 40.5 | 23.6 |
| Oil recovery, % | 56.2 | 72.9 |

Table 4 shows Sand Pack Permeameter test results using a heavy crude oil #3 sample and chemical additive formulation #2 (specifically, PAW4HF) at 150° F.:

TABLE 4

|  | Test without chemical treatment | Test with chemical treatment |
|---|---|---|
| Residual oil saturation, % | 42.2 | 13.3 |
| Oil recovery, % | 52.5 | 85 |

It is to be understood that any recitation of numerical ranges by endpoints includes all numbers subsumed within the recited ranges as well as the endpoints of the range.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method for improving the mobility of heavy crude oil in a porous subterranean reservoir, the method comprising:

introducing a fluid formulation into the reservoir, the fluid formulation comprising water and a surfactant, wherein the surfactant is nonionic and in combination with a co-solvent has a hydrophile/lipophile balance greater than 10, and wherein the surfactant comprises in the range from 20-30% methanol, and wherein the co-solvent comprises a glycol ether, and the fluid formulation further comprises an emulsifier, a drag reducer comprising an ethoxylate surfactant, and a linker, wherein the linker is a glycol, a polyol, a phenol, or an alcohol with more than eight carbon atoms, or combinations thereof; and producing at least one of an emulsion and a dispersion in the reservoir, the emulsion or the dispersion having the water as an external phase and the heavy crude oil as an internal phase.

2. The method of claim 1, wherein the glycol ether comprises one or more of ethylene glycol ether, diethylene glycol ether and triethylene glycol ether.

3. The method of claim 1, wherein the emulsifier comprises a sulfonate.

4. The method of claim 1, wherein the emulsifier comprises a sulfate.

5. The method of claim 1, wherein the emulsifier comprises a carboxylate.

6. The method of claim 1, wherein the emulsifier comprises an ethoxylate surfactant.

7. The method of claim 1, wherein the fluid formulation is injected into the reservoir via an injection well.

8. The method of claim 1, wherein the fluid formulation is pumped into the reservoir from a producer well via a huff and puff process.

9. The method of claim 1, wherein the water is fresh water.

10. The method of claim 1, wherein the water is recycled produced water from a crude oil reservoir.

11. The method of claim 1, wherein the fluid formulation is not an emulsion or a dispersion prior to being introduced into the reservoir.

12. The method of claim 1, wherein the surfactant comprises an amphiphilic chemical compound.

13. The method of claim 12, wherein the amphiphilic chemical compound comprises one or more of a nonionic compound, an anionic compound, a cationic compound, an amphoteric compound and a zwitterionic compounds, or combinations thereof.

14. A method for improving the mobility of heavy crude oil in a porous subterranean reservoir, the method comprising:
  introducing a fluid formulation into the reservoir, the fluid formulation comprising water and a surfactant, wherein the surfactant is nonionic and in combination with a co-solvent has a hydrophile/lipophile balance greater than 10, and wherein the surfactant comprises in the range from 5-10% 2-butoxyethanol, and wherein the co-solvent comprises a glycol ether, and wherein the fluid formulation further comprises an emulsifier, a drag reducer comprising an ethoxylate surfactant, and a linker, wherein the linker is a glycol, a polyol, a phenol, or an alcohol with more than eight carbon atoms, or combinations thereof; and
  producing at least one of an emulsion and a dispersion in the reservoir, the emulsion or the dispersion having the water as an external phase and the heavy crude oil as an internal phase.

15. The method of claim 14, wherein the glycol ether comprises one or more of ethylene glycol ether, diethylene glycol ether and triethylene glycol ether.

16. The method of claim 14, wherein the emulsifier comprises a sulfonate.

17. The method of claim 14, wherein the emulsifier comprises a sulfate.

18. The method of claim 14, wherein the emulsifier comprises a carboxylate.

19. The method of claim 14, wherein the emulsifier comprises an ethoxylate surfactant.

20. The method of claim 14, wherein the fluid formulation is injected into the reservoir via an injection well.

21. The method of claim 14, wherein the fluid formulation is pumped into the reservoir from a producer well via a huff and puff process.

22. The method of claim 14, wherein the water is fresh water.

23. The method of claim 14, wherein the water is recycled produced water from a crude oil reservoir.

24. The method of claim 14, wherein the fluid formulation is not an emulsion or a dispersion prior to being introduced into the reservoir.

25. The method of claim 14, wherein the surfactant comprises an amphiphilic chemical compound.

26. The method of claim 25, wherein the amphiphilic chemical compound comprises one or more of a nonionic compound, an anionic compound, a cationic compound, an amphoteric compound and a zwitterionic compounds, or combinations thereof.

* * * * *